(12) United States Patent
Toeroe

(10) Patent No.: US 7,716,517 B2
(45) Date of Patent: May 11, 2010

(54) DISTRIBUTED PLATFORM MANAGEMENT FOR HIGH AVAILABILITY SYSTEMS

(75) Inventor: Maria Toeroe, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 613 days.

(21) Appl. No.: 11/614,728

(22) Filed: Dec. 21, 2006

(65) Prior Publication Data

US 2008/0155303 A1    Jun. 26, 2008

(51) Int. Cl.
*G06F 11/00*    (2006.01)
(52) U.S. Cl. .............................. 714/3; 714/47
(58) Field of Classification Search .......... 714/3, 714/47; 709/223–226
See application file for complete search history.

(56) References Cited

U.S. PATENT DOCUMENTS 7,222,268 B2 *    5/2007    Zaifman et al. ............... 714/47

2004/0196794 A1*    10/2004    Fu .............................. 370/254
2006/0026272 A1*    2/2006    Sullivan et al. .............. 709/223
2006/0085785 A1    4/2006    Garrett

OTHER PUBLICATIONS

International Search Report for PCT/IB2007/055186 dated Nov. 12, 2008.
"Service AvailabilityTM Forum Application Interface Specification—Availability Management Framework SAI-AIS-AMF-B.02.01", Service Availability Forum Application Interface Specification, XX, XX, Jan. 1, 1900, pp. 1-286, XP007902620.
VMware Incorporation: :VMware VirtualCenter User's Manual Version 1.0 Internet Citation, [Online] XP002341258. Retrieved from the Internet: URL: http://www.vmware.com/pdf/VirtualCenter_Users_Manual.pdf.

* cited by examiner

*Primary Examiner*—Philip Guyton

(57) ABSTRACT

A distributed model for availability management (AM) functions is described. Core AM functionality is provided by at a global level, while supplemental AM functionality is provided at a local (e.g., cluster) level. Extension entities can be provided to supplement provided AM functions.

18 Claims, 7 Drawing Sheets

DISTRIBUTED PLATFORM MANAGEMENT FOR HIGH AVAILABILITY SYSTEMS

TECHNICAL FIELD

The present invention generally relates to high availability systems (hardware and software) and, more particularly, to platform management associated with such high availability systems.

BACKGROUND

High-availability systems (also known as HA systems) are systems that are implemented primarily for the purpose of improving the availability of services which the systems provide. Availability can be expressed as a percentage of time during which a system or service is "up". For example, a system designed for 99.999% availability (so called "five nines" availability) refers to a system or service which has a downtime of only about 0.44 minutes/month or 5.26 minutes/year.

High availability systems provide for a designed level of availability by employing redundant nodes, which are used to provide service when system components fail. For example, if a server running a particular application crashes, an HA system will detect the crash and restart the application on another, redundant node. Various redundancy models can be used in HA systems. For example, an N+1 redundancy model provides a single extra node (associated with a number of primary nodes) that is brought online to take over the role of a node which has failed. However, in situations where a single HA system is managing many services, a single dedicated node for handling failures may not provide sufficient redundancy. In such situations, an N+M redundancy model, for example, can be used wherein more than one (M) standby nodes are included and available.

As HA systems become more commonplace for the support of important services such file sharing, internet customer portals, databases and the like, it has become desirable to provide standardized models and methodologies for the design of such systems. For example, the Service Availability Forum (SAF) has standardized application interface services (AIS) to aid in the development of portable, highly available applications. As shown in the conceptual architecture stack of FIG. 1, the AIS 10 is intended to provide a standardized interface between the HA applications 14 and the HA middleware 16, thereby making them independent of one another. As described below, each set of AIS functionality is associated with an operating system 20 and a hardware platform 22. The reader interested in more information relating to the AIS standard specification is referred to Application Interface Specifications (AIS), Version B.02.01, which is available at www.saforum.org.

Of particular interest for the present application is the Availability Management Framework (AMF), which is a software entity defined within the AIS specification. According to the AIS specification, the AMF is a standardized mechanism for providing service availability by coordinating redundant resources within a cluster to deliver a system with no single point of failure. The AMF provides a set of application program interfaces (APIs) which determine, among other things, the states of components within a cluster and the health of those components. The components are also provided with the capability to query the AMF for information about their state. An application which is developed using the AMF APIs and following the AMF system model leaves the burden of managing the availability of its services to the AMF. Thus, such an application does not need to deal with dynamic reconfiguration issues related to component failures, maintenance, etc.

As specified in the foregoing standards, each AMF (software entity) provides availability support for a single logical cluster that consists of a number of cluster nodes and components as shown in FIG. 2. For example, a first cluster A includes its own AMF 24, two AMF nodes 26, 28 and four AMF components 30-36. Similarly, a second cluster B has its own AMF 38, two AMF nodes 40, 42 and four AMF components 44-50. The components 30-36 and 44-50 each represent a set of hardware and software resources that are being managed by the AMFs 24 and 38, respectively. In a physical sense, components are realized as processes of an HA application. The nodes 26, 28, 40, 42 each represent a logical entity which corresponds to a physical node on which respective processes managed as AMF components are being run, as well as the redundancy elements allocated to managing those nodes' availability.

In operation, each cluster is treated as its own fault zone and, therefore, AMF A 24 and AMF B 38 operate independently of one another. For some applications, the provision of independent AMF software entities may pose no particular problems. However if, for example, virtualization is introduced such that one clusters' nodes are running across multiple hardware platforms, the AMF architecture illustrated in FIG. 2 becomes problematic. For example, if one AMF decides to reboot a server that it is monitoring and that server contains a virtual node associated with a different cluster, then the other AMF, responsible for that virtual node, would detect the reboot as a failure and institute its own remedial (potentially inappropriate) action.

Accordingly, it would be desirable to provide platform management systems and methods for HA applications which avoid the afore-described problems and drawbacks.

SUMMARY

According to an exemplary embodiment, a system includes a hardware platform for supporting a service. An availability management (AM) software entity supports availability of the service. The AM software entity is distributed to include a first global availability management core ($AMC_g$) portion, at a first hierarchical level, having a first set of AM functions associated therewith, a first plurality of local AMC ($AMC_l$) portions, at a second hierarchical level, having a second set of AM functions associated therewith, and a first plurality of AMC components, at a third hierarchical level, which are supplied with the first and second sets of AM functions to support availability of the service.

According to another exemplary embodiment, a system includes a hardware platform for supporting a service. An availability management (AM) software entity supports availability of the service. The AM software entity includes a first global availability management core ($AMC_g$) portion having a first set of AM functions associated therewith, and a first AM extension portion having a second set of one or more AM functions associated therewith, wherein the first AM extension portion is a plug-in software entity which supplements the first set of AM functions supplied by the $AMC_g$ portion.

According to another exemplary embodiment, a method includes the steps of providing, by a hardware platform, a service, and distributing an availability management (AM) software entity which supports availability of the service. The AM software entity is distributed to include a first global availability management core ($AMC_g$) portion, at a first hierarchical level, having a first set of AM functions associated therewith, a first plurality of local AMC (AMC$_l$) portions, at a second hierarchical level, having a second set of AM functions associated therewith, and a first plurality of AMC components, at a third hierarchical level, which are supplied with the first and second sets of AM functions to support availability of the service.

According to yet another exemplary embodiment, a method includes the steps of: providing, by a hardware platform, a service, and supporting availability of the service by an availability management (AM) software entity. The AM software entity includes a first global availability management core (AMC$_g$) portion having a first set of AM functions associated therewith, and a first AM extension portion having a second set of one or more AM functions associated therewith, wherein the first AM extension portion is a plug-in software entity which supplements the first set of AM functions supplied by the AMC$_g$ portion.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Figure 1:
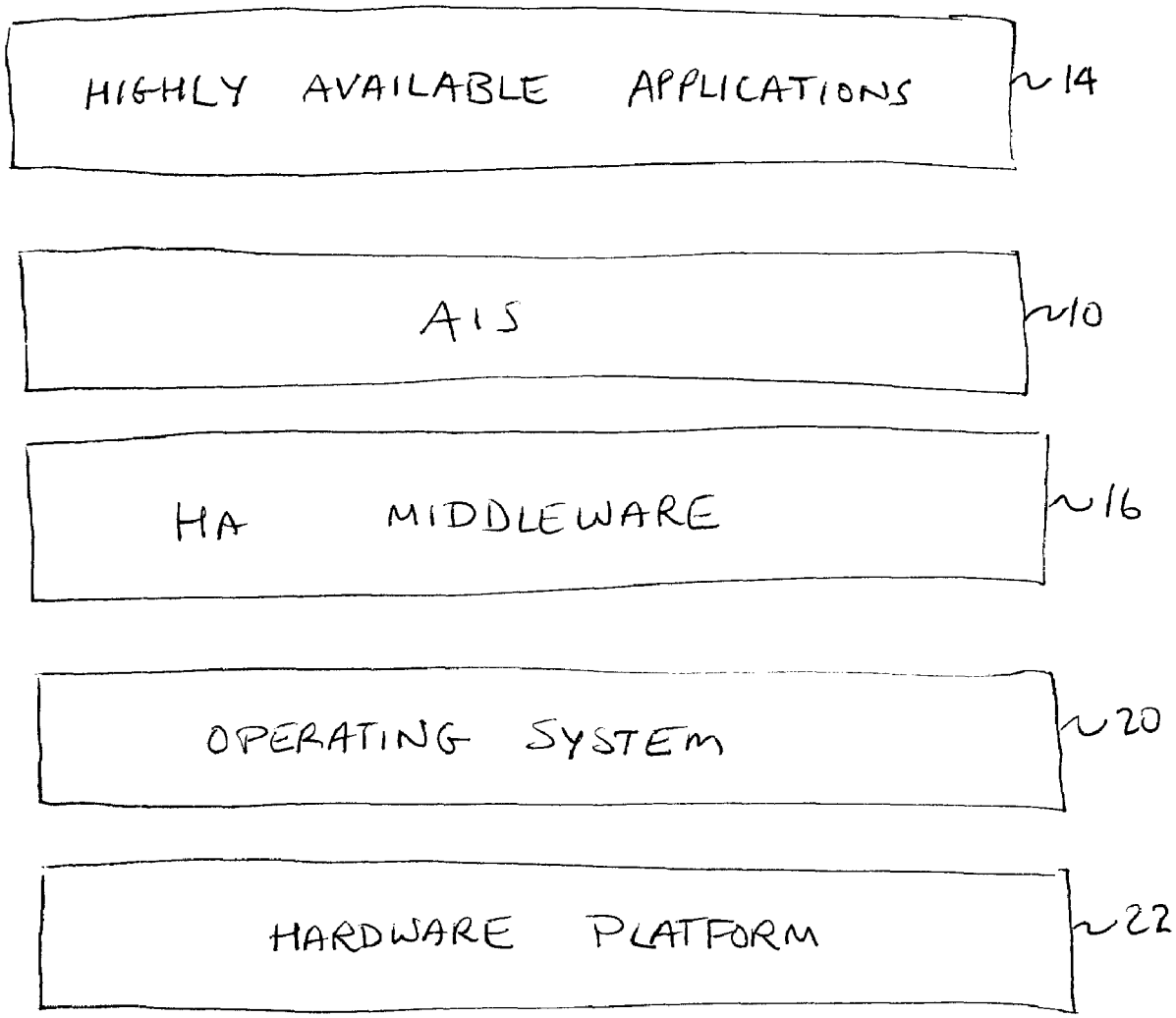
FIG. 1 illustrates a conceptual architecture stack associated with application interface services (AIS)
Figure 2:
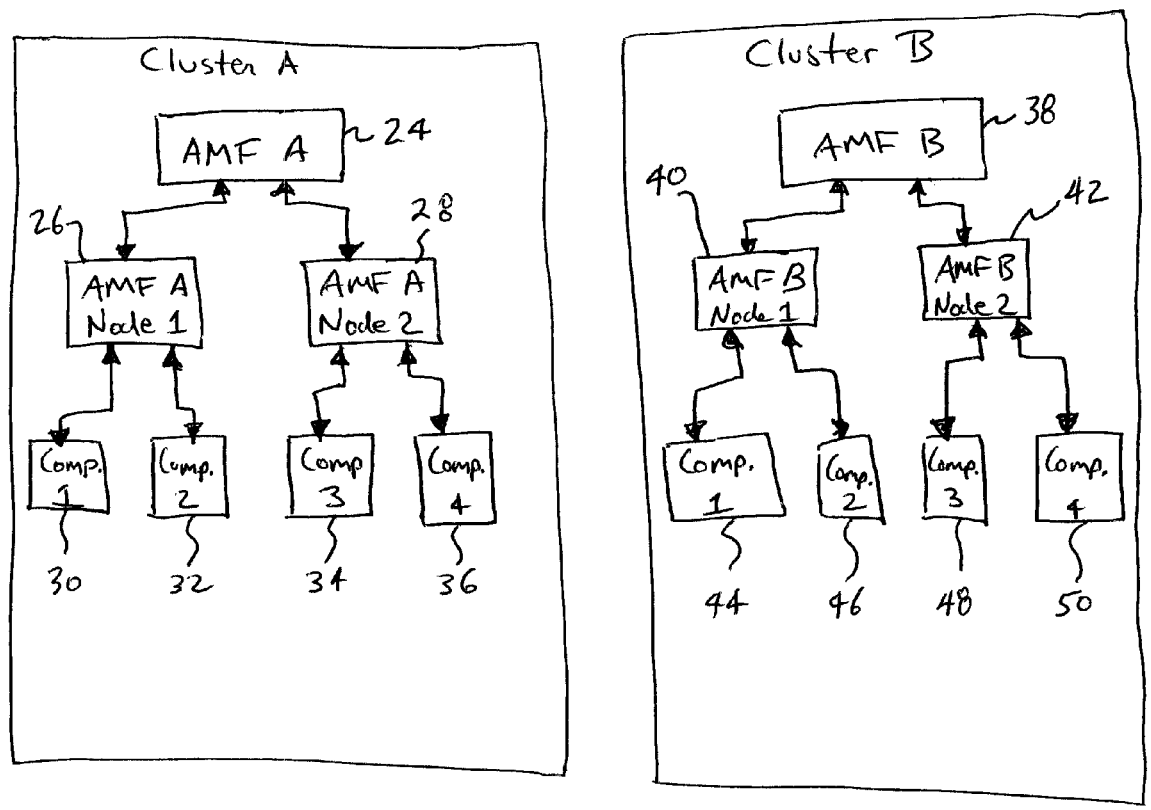
FIG. 2 illustrates a conventional availability management framework (AMF) cluster architecture.
Figure 3:
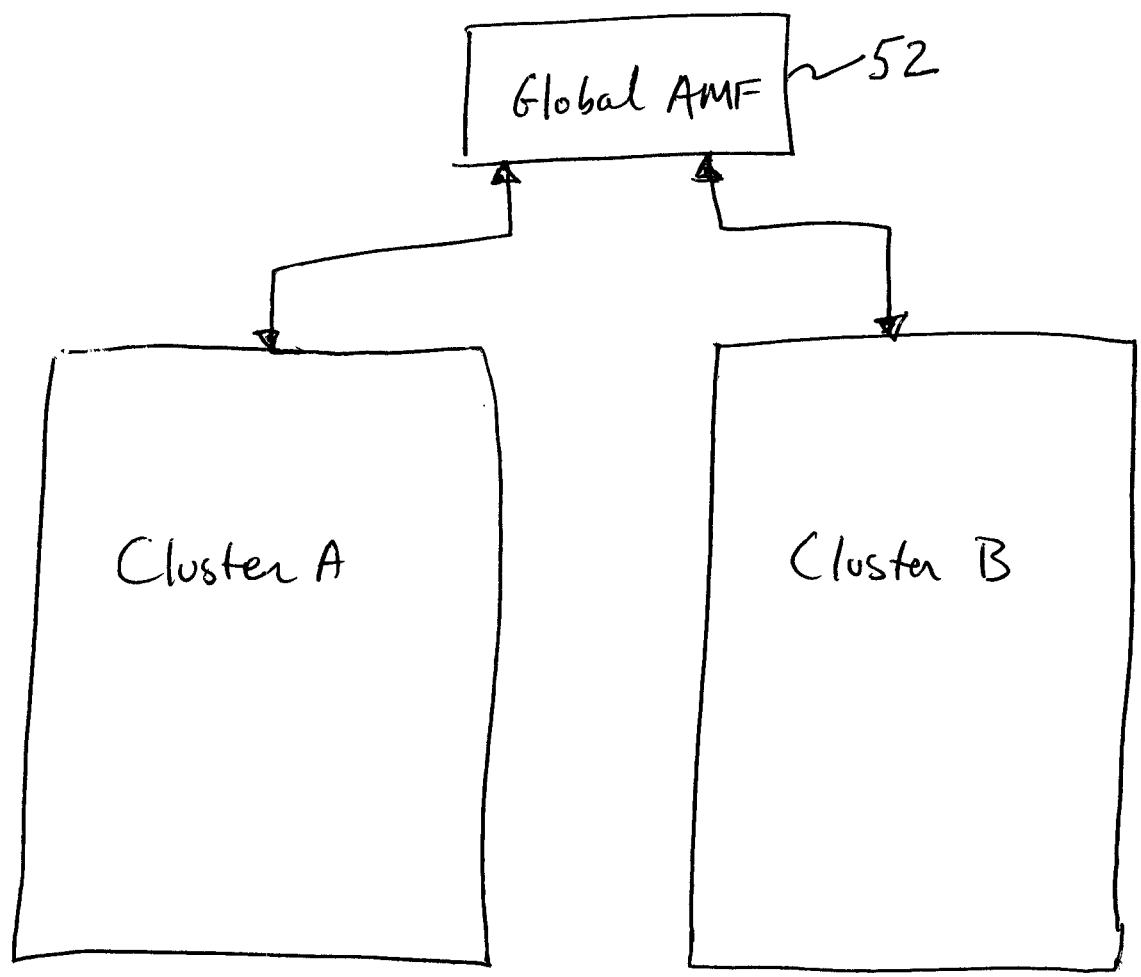
FIG. 3 shows one exemplary mechanism for providing platform management to multiple clusters.

As mentioned above, the scope of availability management as promulgated by the SAF is limited to providing each cluster with its own AMF software entity, i.e., independently of one another. In order to address the challenges associated with the introduction of virtualization, among other things, one possible solution is to introduce a global AMF 52 that oversees all system components as shown conceptually in FIG. 3. However, not every cluster will require every possible AMF function—in some cases only basic redundancy needs to be provided in order to support high availability of the process or hardware managed by a particular AMF cluster.

Figure 4:
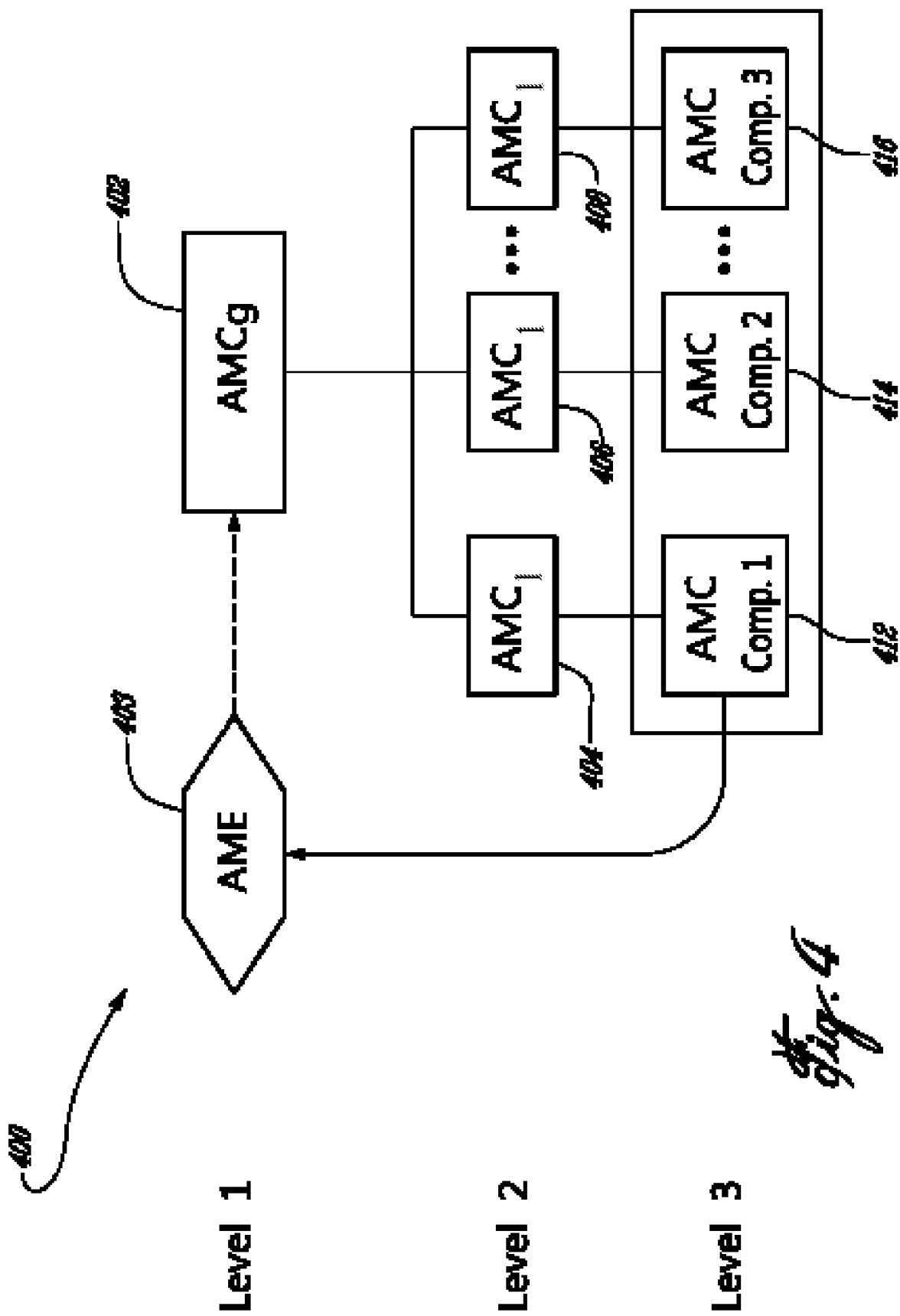
FIG. 4 depicts a distributed platform management according to an exemplary embodiment.

Thus, to address such cases and for other reasons, a distributed form of availability management can be provided, instead of the global AMF 52, according to exemplary embodiments, an example of which is provided as FIG. 4. Therein, an availability management entity 400 includes a number of levels of distributed functionality. In this example three levels of hierarchy are illustrated, however those skilled in the art will appreciate that distributed platform management according to these exemplary embodiments could have more or fewer levels. At a first level in FIG. 4, a global availability management core (AMC$_g$) 402 is a software entity which operates, by itself (i.e., not considering management extension (AME) 403), to provide a first set of availability management functions that includes the availability management to each of the local availability management cores (AMC$_l$) 404, 406, and 408 of the second level. AMC$_g$ 402 and AMC$_l$s 404, 406, and 408 combined provide a second or basic set of availability management functions to AMC components 412, 414, and 416 of the third level.

The first set of availability functions provided by the AMC$_g$ 400 can be augmented by a third set of one or more functions provided by an availability management extension (AME) 403 at the same level as the AMC$_g$ within the distributed hierarchy. The AME 403 is a plug-in which operates to supplement the core functions provided by the AMC$_g$ 402. Examples of specific functions which can belong to the first set of functions and the third set of functions are provided below. The AME 403 is provided by one of the AMC components 412, 414 or 416 (in this example AMC component 412). The AMC components 412, 414 and 416 each are capable of providing the AME 403 so that the third set of functions provided by AME 403 are redundantly supported by the distributed platform management 400.

As mentioned above, the first set of availability functions provided by the AMC$_g$ 402, plus the third set of availability functions provide by the AME are supplied by the AMC$_g$ 402 to its local availability management core (AMC$_l$) software entities 404, 406 and 408 at a second level of the distributed availability management entity 400. The combination of the first, second and third sets of AM functions can be characterized as a fourth set of availability management functions that support an extended availability management of components (not shown in FIG. 4) that require such extended availability. In a single cluster environment, an AMC$_g$ can be associated with the cluster, while the different AMC$_l$s can, for example, be associated with different (virtual) nodes. In this latter case, the fourth set of availability management functions which are supplied via the AMC$_l$s 404, 406 and 408 can be used for availability management of components as it is defined by the SAF. In a multi-cluster environment an AMC$_g$ can be associated with the system platform, while each AMC$_l$ is associated with a different (virtual) cluster where their (virtual) nodes are the AMC components. To provide availability management for processes within the (virtual) clusters of such multicluster system, these two environments need to be combined.

By collocating the AMC$_g$ and AMC$_l$, any number of hierarchical levels can be provided according to exemplary embodiments of the present invention. From the perspective of each set of software entities, a "lower" entity will view the next "higher" entity as its global AMC. Each set of AMC$_g$ and AMC$_l$s (or a distributed AMC) may be extended with one or more availability management extension functions (AMEs). Within any one such set of AMC$_g$ and AMC$_l$s, the set of functions provided by an AME will be mutually exclusive from the set of availability management functions provided by the AMC(s) which it is augmenting. To render this distribution of availability management (AM) functions more concrete, the following example illustrates a distributed platform management software entity in the context of a physical system which it supports.

Figure 5:
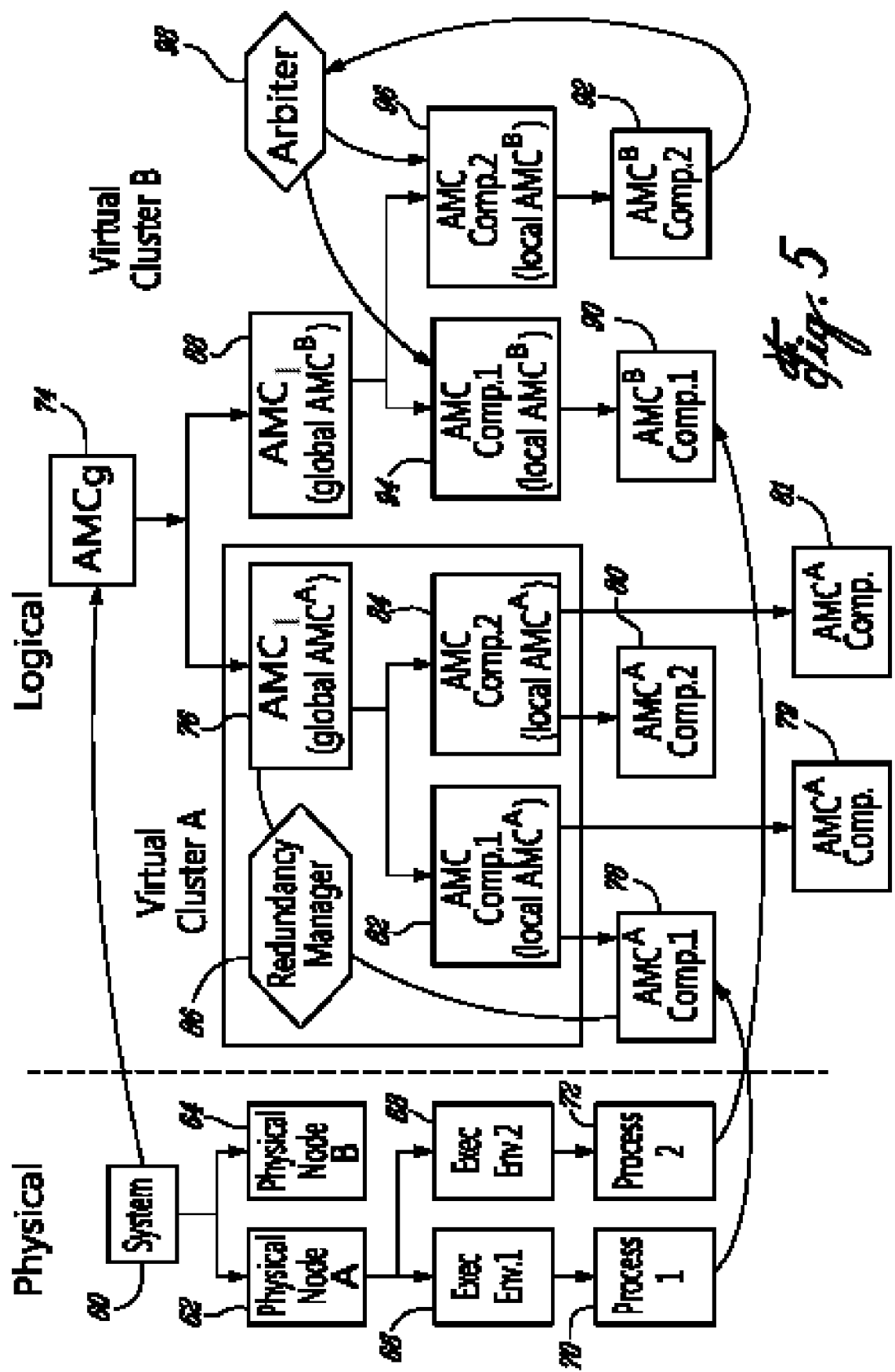
FIG. 5 depicts a distributed platform management according to another exemplary embodiment.

In FIG. 5, a physical representation of a system being supported for high availability is illustrated on the left-hand side of the figure, while a logical representation of the associated distributed AM portions used to provide this support is illustrated on the right-hand side. Starting on the left-hand side, a system 60, e.g., a server system, can include multiple physical nodes, in this example physical node A 62 and physical node B 64. As one purely illustrative example, the physical nodes A and B can be processor cores associated with system 60. The physical node A 62 has two different execution environments (e.g., operating system instances) 66 and 68 associated therewith. Each execution environment 66 and 68 manages and implements its own process 70 and 72, respectively. Physical node B 64 could have a similar set of execution environments and processes which are not illustrated here to simplify the figure.

The distributed AM software entity which supports availability of the system 60 and its components 62-72 according to this exemplary embodiment is illustrated logically on the left-hand side of FIG. 5. Therein, a global AMC portion 74 provides a core set of AM functions to multiple, virtual clusters. In this example two logical clusters (A and B) are illustrated, but those skilled in the art will appreciate that other embodiments may include more than two virtual clusters being supported by a single global AMC portion 74. A detailed example of a set of core functions which can be provided by the global AMC 74 is described below. The virtual cluster A's $AMC_l$ portion 76 coordinates communications between the global AMC 74, and the AMC components 82 and 84 which represent the physical nodes 62 and 64, respectively, in the virtual cluster A. Note that with respect to, for example, cluster A (and as indicated in parentheses in block 76) the local AMC 76 can also be viewed as a global $AMC^A$ for cluster A from the perspective of entities which are at a lower level in the distributed hierarchy, e.g., AMC components 82 and 84. Likewise these components 82 and 84 can be viewed from that same perspective as local $AMC^A$ portions representing the execution environments belonging to cluster A (e.g. execution environment 66 for node 62).

The local $AMC^A$ portions 82 and 84 manage the availability of $AMC^A$ components 78 and 80. As mentioned above with respect to similar structures in FIG. 4, the $AMC^A$ components 78 and 80 redundantly support an AME 86 which, in this example, is a redundancy manager and is described in more detail below. The $AMC^A$ components 78 and 80 are implemented by processes associated with the system 60. Only process 70 is specifically represented in FIG. 5, which process is represented for availability management purposes as $AMC^A$ component 78 and which (at the moment in time illustrated in FIG. 5) provides the redundancy manager functionality to $AMC^A$ entities in cluster A.

As mentioned above, the global AMC portion 74 will include a set of AM functions which are provided to each cluster being managed by the global AMC 74. According to one exemplary embodiment, this set of AM functions includes those functions which are expected to be used by all clusters to support availability of the particular physical elements and processes to which they are assigned. For example, this set of functions can include: (a) a function for monitoring a health of entities managed by the global AMC portion 74 (a watch-dog functionality), (b) a function for notifying dependent entities of a status of entities upon which they are dependent, (c) a function for managing lifecycles of the entities managed by the global AMC portion 74, e.g., to start and stop such entities, to enable instantiating, terminating and repairing such entities, (d) a function for assigning service roles, e.g., with plug-ins for decision logic, (e) a function for role assumption, e.g., again with plug-ins for different roles such as active, standby and spare, (f) a function for communicating with AM extension portions, e.g., toward peer entities and/or subordinate entities, both with plug-in capability for remote/alternative location and tunnel communication toward subordinates, and (g) a function for restarting the global AMC portion 74 and/or AM extension portions (e.g., bootstrap sequences). According to other exemplary embodiments, a global AM portion 74 may include fewer than all of the afore-listed functions.

The AM extension portions mentioned above refer to extensions to the global $AMC^A$ portion 76. Each cluster or virtual cluster, e.g., cluster A and cluster B in FIG. 5, may have its own AM extension portion which extends the AM functionality of the respective AMC 76, 88 in the manner needed to support availability management of the specific physical elements being supported by that cluster. For example, consider virtual cluster A in FIG. 5. Suppose that an HA service X whose availability is supported by virtual cluster A requires a more complicated redundancy model (e.g., M+N) than that which is supported by the global AMC portion 76. In this purely illustrative example, the AMC component 78 would then provide an AM extension portion 86 that communicates with the virtual cluster A's $AMC^A$ portion 76 to support the management of this more complicated redundancy model within the distributed AM structure according to this exemplary embodiment. Virtual cluster A's $AMC^A$ portion 76 can use the outputs of the AM extension portion 86 to, for example, generate its decisions regarding role assignments and life cycle of the components that provide HA service X, represented by $AMC^A$ components 79 and 81. Since the redundancy model handled by AM extension 86 is not required to support every clusters' AM operation, it is not included (in this example) in the set of functions provided by the global AMC portion 74, but is instead provided locally at the cluster level as an extension or plug-in.

Looking now at virtual cluster B in FIG. 5, a similar logical structure to that described above with respect to virtual cluster A is shown. Therein, virtual cluster B's local AMC portion 88 coordinates communications between the global AMC portion 74 and the AMC components 94 and 96 at the platform management level. In this example (at the cluster level), the virtual cluster B's $AMC^B$ portion 88 includes two virtual nodes 94 and 96. Virtual node 94, for example, corresponds to the physical execution environment 68. This virtual node (aka local $AMC^B$) 94, in turn, manages the $AMC^B$ component 90 and local $AMC^B$ 96 manages $AMC^B$ component 92, which encapsulate specific application functionality and which can be different than that associated with $AMC^A$ components 78 and 80. In this example, $AMC^B$ component 90 (and $AMC^B$ component 92) supports availability of AME 98 as indicated by the arrow therebetween. $AMC^B$ components 90 and 92 represent different processes associated with system 60, e.g., $AMC^B$ component 90 represents process 72, under the supervision of local $AMC^B$ portion 88.

Thus it will be appreciated that the exemplary embodiment of FIG. 5 provides an example wherein two different virtual clusters associated with availability management functionality (virtual cluster A and virtual cluster B) are associated with a single, physical node (physical node 62), thereby illustrating a specific scenario wherein platform management according to these exemplary embodiments is particularly useful. Of course those skilled in the art will also appreciate that the present invention is not limited to the physical or logical structures illustrated in FIG. 5, but will instead be applicable to many alternative embodiments.

As compared with virtual cluster A, in this exemplary embodiment the $AMC^B$ function itself requires an AM function which is not provided by the local $AMC^B$ portions 94 and 96. More specifically, in this example, $AMC^B$ requires an arbiter function which negotiates the election of a particular local $AMC^B$ portion 94 or 96 to assume the role as the global $AMC^B$ relative to local $AMC^B$ 94 and 96. This arbiter function extends each local $AMC^B$ prior to the provision of a global $AMC^B$ therefore the availability of AMC components 90 and 92 is managed locally based only on the respective local AMC portion 94 and 96 with no extensions.

The foregoing provides a specific example of a distributed, hierarchical platform availability management system according to an exemplary embodiment. However, it will be appreciated that other exemplary embodiments can be expressed in a more general way. For example, according to these exemplary embodiments, an availability management (AM) software entity supports availability management of service(s) provided by a hardware platform, the AM software entity being distributed to include a first global availability management core ($AMC_g$) portion, at a first hierarchical level, having a first set of AM functions associated therewith, a first plurality of local AMC ($AMC_l$) portions, at a second hierarchical level, having a second set of AM functions associated therewith, and a first plurality of AMC components, at a third hierarchical level, which are supplied with the first and second sets of AM functions to support availability of the service(s). Additionally, exemplary embodiments can be viewed as a combination of one or more AM entities which have their AM function sets augmented by an AM extension. For example, such an exemplary embodiment can be expressed as a hardware platform for supporting a service(s) and an availability management (AM) software entity which supports availability of the service(s), the AM software entity including a first global availability management core ($AMC_g$) portion having a first set of AM functions associated therewith and a first AM extension portion having a second set of one or more AM functions associated therewith, wherein the first AM extension portion is a plug-in software entity which supplements the first set of AM functions supplied by said $AMC_g$ portion.

In this latter regard, the global AMC portion can be viewed as a root node having a basic set of AM functions which it can supply to multiple clusters, and the AM extension portion can be viewed as a leaf node connected to the root node for augmenting its functionality with supplemental AM functions. It should also be noted that exemplary embodiments are not limited to supporting virtual clusters, nor is it required that each cluster or virtual cluster being supported by a global AMC portion 74 have its own AM extension(s) associated therewith. For example, an AM cluster or virtual cluster associated with an entity that is solely hardware may have its availability needs fully satisfied by the set of AM functions provided by the global AMC portion 74 and, therefore, have no need for an AM extension portion.

Figure 6:
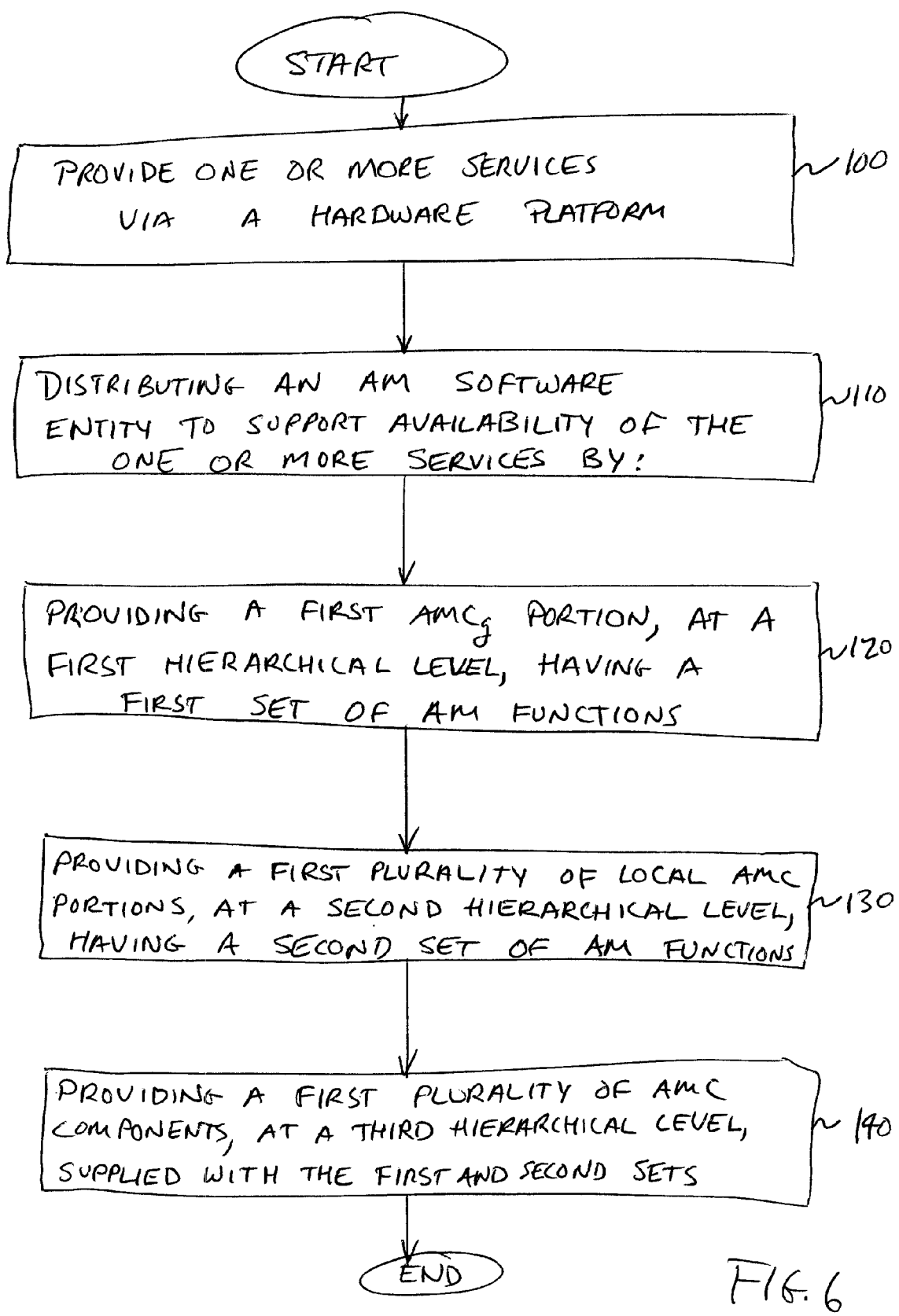
FIG. 6 is a flowchart illustrating a method for providing distributed platform management according to an exemplary embodiment.

Accordingly, a general process for providing availability management according to an exemplary embodiment is illustrated in the flowchart of FIG. 6. Therein, at step 100, one or more services are provided by a hardware platform. To support availability of those service(s), an availability management (AM) software entity is distributed (step 110) by (a) providing a first global availability management core ($AMC_g$) portion, at a first hierarchical level, having a first set of AM functions associated therewith (step 120), (b) providing a first plurality of local AMC ($AMC_l$) portions, at a second hierarchical level, having a second set of AM functions associated therewith (step 130), and (c) providing a first plurality of AMC components, at a third hierarchical level, which are supplied with the first and second sets of AM functions to support availability of the service(s).

Figure 7:
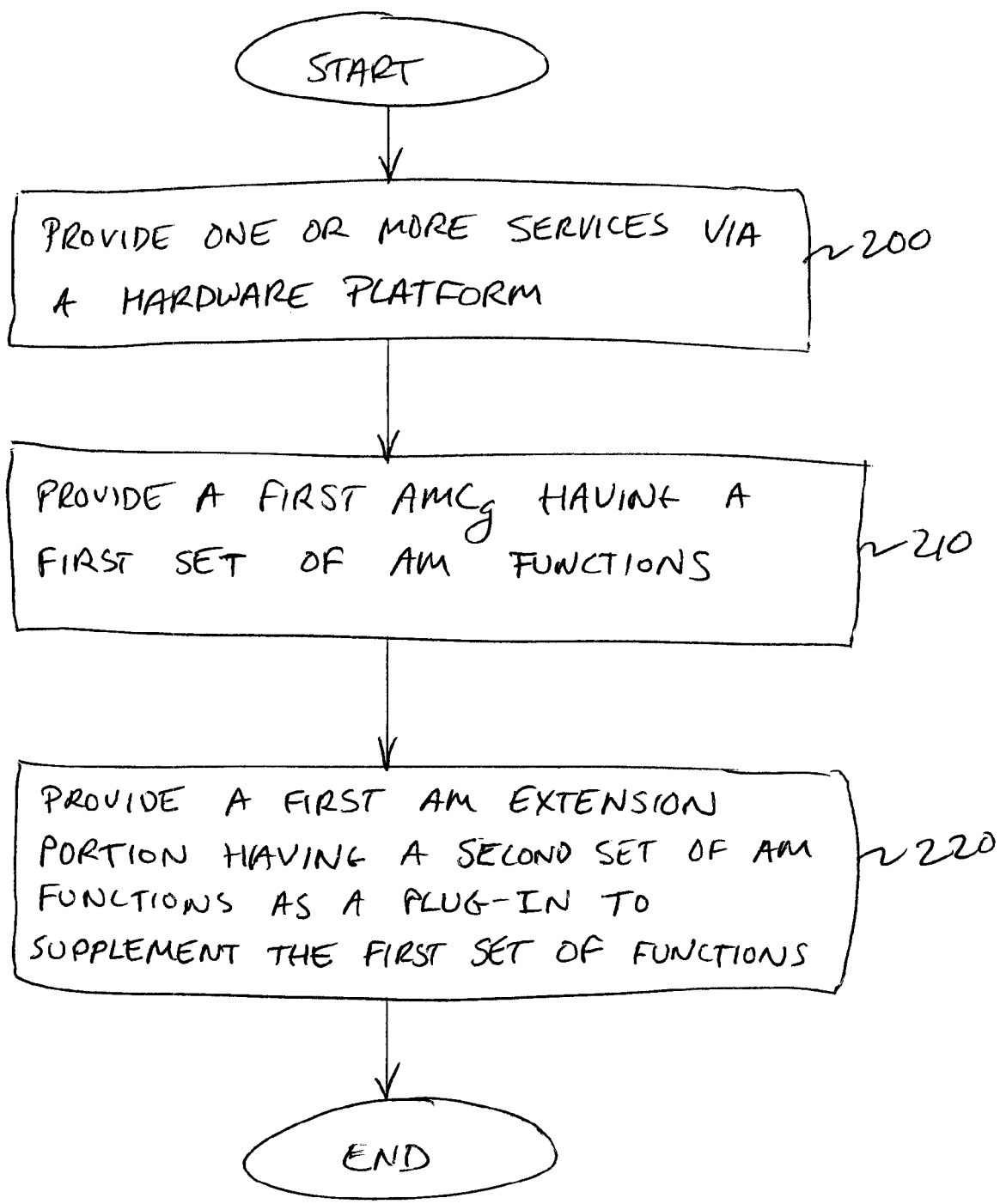
FIG. 7 is a flowchart illustrating a method for providing platform management according to another exemplary embodiment.

According to another exemplary embodiment, a general process for providing availability management includes the steps illustrated in the flowchart of FIG. 7. Therein, at step 200, one or more services are provided by a hardware platform. To support availability of those service(s), an availability management (AM) software entity provides a first global availability management core ($AMC_g$) portion having a first set of AM functions associated therewith (step 210), and a first AM extension portion having a second set of one or more AM functions associated therewith, wherein the first AM extension portion is a plug-in software entity which supplements the first set of AM functions supplied by said $AMC_g$ portion (step 220).

Several examples of AM functions which can be provided as AM extension portions were described above in the context of the exemplary embodiment of FIG. 5. However it will be appreciated by those skilled in the art that other AM functions can also be provided as AM extension portions. For example, another type of AM extension could be provided which calculates dependencies between service instances or applications running on a system being supported by platform management systems and methods according to these exemplary embodiments. More generally, AM extension portions will typically have (a) a function for enabling lifecycle control of the first AM extension portion by the global system AMC portion, (b) a function for communicating with the global AMC portion, (c) a function for operating in accordance with one of a plurality of service roles and (d) a function for providing an application program interface (API) associated with the first AM extension portion's function. According to exemplary embodiments, the AM extension portions can be implemented as processes which can be operated independently, thus minimizing the need for AMC upgrades.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A system comprising:
a hardware platform for supporting a service;
an availability management (AM) software entity which supports availability of said service, said AM software entity being distributed to include:
   a first global availability management core ($AMC_g$) portion, at a first hierarchical level, having a first set of AM functions associated therewith;
   a first plurality of local AMC ($AMC_l$) portions, at a second hierarchical level, having a second set of AM functions associated therewith; and
   a first plurality of AMC components, at a third hierarchical level, which are supplied with said first and second sets of AM functions to support availability of said service; and
a first AM extension portion having a third set of one or more AM functions associated therewith, said first AM extension portion being a plug-in software entity located at said first hierarchical level and said third set of AM functions being mutually exclusive of said first and second sets of AM functions.

2. The system of claim 1, wherein said first plurality of AMC components, provided at said third hierarchical level, are each managed by a respective one of said plurality of local AMC portions and provide redundancy for said first AM extension portion.

3. The system of claim 1, wherein said first set of AM functions includes at least one of: (a) a function for monitoring a health of entities managed by said global AMC portion, (b) a function for notifying dependent entities of a status of entities upon which they are dependent, (c) a function for managing lifecycles of said entities, (d) a function for assigning service roles; (e) a function for role assumption; (f) a function for communicating with said first AM extension portion and (g) a function for restarting one or more of said global AMC portion and said first AM extension portion.

4. The system of claim 1, wherein said third set of functions includes: at least one of: (a) a function for enabling lifecycle control of said first AM extension portion by said system global AMC portion, (b) a function for communicating with said global AMC portion, (c) a function for operating in accordance with one of a plurality of service roles, and (d) a function for providing an application program interface (API) associated with said first AM extension portion's function.

5. The system of claim 1, wherein said third set of AM functions associated with said first AM extension portion provides for a redundancy model which is not supported by said first set of AM functions.

6. The system of claim 1, wherein said first global availability management core ($AMC_g$) portion, said first plurality of local AMC ($AMC_l$) portions and said first plurality of AMC components are all associated with a first virtual cluster, said system further comprising a second virtual cluster having:
a second global availability management core ($AMC_g$) portion, at said first hierarchical level, having a fourth set of AM functions associated therewith;
a second plurality of local AMC ($AMC_l$) portions, at said second hierarchical level, having a fifth set of AM functions associated therewith; and
a second plurality of AMC components, provided at said third hierarchical level, which are supplied with said fourth and fifth sets of AM functions to support availability of said service.

7. The system of claim 6, further comprising:
a second AM extension portion having a sixth set of one or more AM functions associated therewith; and wherein said second plurality of AMC components, provided at said third hierarchical level, are each managed by a respective one of said second plurality of local AMC components, to redundantly provide said second AM extension portion.

8. The system of claim 7, wherein said sixth set of AM functions associated with said second AM extension portion provides for a role arbitration function which is not supported by said fourth set of AM functions.

9. The system of claim 6, further comprising:
a system-level $AMC_g$ disposed at a hierarchical level above said first hierarchical level for communicating with, and coordinating availability management between, said first and second virtual clusters.

10. A method comprising the steps of:
providing, by a hardware platform, a service;
distributing an availability management (AM) software entity which supports availability of said service, said AM software entity being distributed to include:
a first global availability management core ($AMC_g$) portion, at a first hierarchical level, having a first set of AM functions associated therewith;
a first plurality of local AMC ($AMC_l$) portions, at a second hierarchical level, having a second set of AM functions associated therewith; and
a first plurality of AMC components, at a third hierarchical level, which are supplied with said first and second sets of AM functions to support availability of said service; and
providing a first AM extension portion having a third set of one or more AM functions associated therewith, said first AM extension portion being a plug-in software entity located at said first hierarchical level and said third set of AM functions being mutually exclusive of said first and second sets of AM functions.

11. The method of claim 10, wherein said first plurality of AMC components, provided at said third hierarchical level, are each managed by a respective one of said plurality of local AMC portions and provide redundancy for said first AM extension portion.

12. The method of claim 10, wherein said first set of AM functions includes at least one of: (a) a function for monitoring a health of entities managed by said global AMC portion, (b) a function for notifying dependent entities of a status of entities upon which they are dependent, (c) a function for managing lifecycles of said entities, (d) a function for assigning service roles; (e) a function for role assumption; (f) a function for communicating with said first AM extension portion, and (g) a function for restarting one or more of said global AMC portion and said first AM extension portion.

13. The method of claim 10, wherein said third set of functions includes: at least one of: (a) a function for enabling lifecycle control of said first AM extension portion by said system global AMC portion, (b) a function for communicating with said global AMC portion, (c) a function for operating in accordance with one of a plurality of service roles, and (d) a function for providing an application program interface (API) associated with said first AM extension portion's function.

14. The method of claim 10, wherein said third set of AM functions associated with said first AM extension portion provides for a redundancy model which is not supported by said first set of AM functions.

15. The method of claim 10, wherein said first global availability management core ($AMC_g$) portion, said first plurality of local AMC ($AMC_l$) portions and said first plurality of AMC components are all associated with a first virtual cluster, said method further comprising the step of providing a second virtual cluster having:
a second global availability management core ($AMC_g$) portion, at said first hierarchical level, having a fourth set of AM functions associated therewith;
a second plurality of local AMC ($AMC_l$) portions, at said second hierarchical level, having a fifth set of AM functions associated therewith; and
a second plurality of AMC components, provided at said third hierarchical level, which are supplied with said fourth and fifth sets of AM functions to support availability of said service.

16. The method of claim 15, further comprising the step of:
providing a second AM extension portion having a sixth set of one or more AM functions associated therewith; and wherein said second plurality of AMC components, provided at said third hierarchical level, are each managed by a respective one of said second plurality of local AMC portions, to redundantly provide said second AM extension portion.

17. The method of claim 16, wherein said sixth set of AM functions associated with said second AM extension portion provides for a role arbitration function which is not supported by said fourth set of AM functions.

18. The method of claim 15, further comprising the step of:
providing a system-level $AMC_g$ disposed at a hierarchical level above said first hierarchical level for communicating with, and coordinating availability management between, said first and second virtual clusters.

* * * * *